United States Patent
Nagara et al.

(10) Patent No.: US 7,218,580 B2
(45) Date of Patent: May 15, 2007

(54) SKEW DETECTION METHOD, OPTICAL PICKUP, AND OPTICAL DISC DEVICE

(75) Inventors: Toru Nagara, Tokyo (JP); Kyosuke Miyano, Tokyo (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 10/495,466

(22) PCT Filed: Sep. 12, 2003

(86) PCT No.: PCT/JP03/11742

§ 371 (c)(1),
(2), (4) Date: May 11, 2004

(87) PCT Pub. No.: WO2004/025637

PCT Pub. Date: Mar. 25, 2004

(65) Prior Publication Data

US 2004/0264313 A1    Dec. 30, 2004

(30) Foreign Application Priority Data

Sep. 13, 2002    (JP)    ............................. 2002-267871

(51) Int. Cl.
*G11B 7/00*    (2006.01)
(52) U.S. Cl. ............................. 369/44.32; 369/44.41; 369/53.19
(58) Field of Classification Search ............. 369/53.19, 369/53.12, 53.23, 53.28, 53.35
See application file for complete search history.

(56) References Cited

U.S. PATENT DOCUMENTS

| | | | | |
|---|---|---|---|---|
| 4,674,078 A | * | 6/1987 | Otsuka et al. ........... | 369/44.25 |
| 5,663,945 A | * | 9/1997 | Hayashi et al. .......... | 369/47.35 |
| 5,675,564 A | * | 10/1997 | Muramatsu et al. ..... | 369/53.19 |
| 6,167,008 A | * | 12/2000 | Kuribayashi ............. | 369/44.32 |
| 6,493,296 B1 | * | 12/2002 | Fukumoto et al. ....... | 369/44.32 |
| 6,687,204 B2 | * | 2/2004 | Miyanabe et al. ....... | 369/47.17 |
| 6,707,773 B2 | * | 3/2004 | Katayama ................ | 369/53.19 |
| 2001/0036137 A1 | * | 11/2001 | Katayama ................ | 369/53.19 |
| 2004/0062158 A1 | * | 4/2004 | Arai et al. ............... | 369/44.32 |

FOREIGN PATENT DOCUMENTS

| | | |
|---|---|---|
| JP | 2001-118272 | 4/2001 |
| JP | 2001-118273 | 4/2001 |
| JP | 2004 236666 | 8/2001 |
| JP | 2002 373437 | 12/2002 |

* cited by examiner

*Primary Examiner*—Muhammad Edun
(74) *Attorney, Agent, or Firm*—Oblon, Spivak, McClelland, Maier & Neustadt, P.C.

(57) ABSTRACT

There is employed a configuration to detect, by making use of an optical pick-up (104) when tracking servo is performed along wobble grooves of an optical disc (102), phase errors between main wobble signal outputted as the result of the fact that reflected light beams corresponding to main spot of the optical disc (102) are received at a main light receiving section (321) of light detecting means (32) and side wobble signals outputted every side spot as the result of the fact reflected light beams corresponding to respective side spots of the optical disc (102) are received at a first sub-light receiving section (322) and a second sub-light receiving section (323) to calculate difference between the both phase errors at a difference calculating circuit (59) to generate, from this difference, a skew signal including inclination direction and inclination quantity of the optical disc (102).

20 Claims, 8 Drawing Sheets

(A) Rskew=+
(B) Rskew=0
(C) Rskew=−
(D) Rskew=+
(E) Rskew=0
(F) Rskew=−
(G) MainWobble

SKEW DETECTION METHOD, OPTICAL PICKUP, AND OPTICAL DISC DEVICE

TECHNICAL FIELD

The present invention relates to a skew detection method, and an optical pick-up and an optical disc apparatus using a skew detecting device for detecting inclination (radial skew) of optical recording medium (optical disc such as DVD-R, DVD-RW, DVD+R, DVD+RW, CD-R or CD-RW, etc.), and more particularly to a skew detection method, and an optical pick-up and an optical disc apparatus using a skew detecting device which are adapted to have ability to detect inclination of optical recording medium by making use of an optical system for recording/reproduction and a signal detecting system of the optical recording medium.

Further, this Application claims priority of Japanese Patent Application No. 2002-267871, field on Sep. 13, 2002, the entirety of which is incorporated by reference herein.

BACKGROUND ART

In accordance with the fact that density of recording onto optical disc is caused to be high, skew margin of optical disc becomes less. For this reason, at the optical pick-up, skew sensor is used to detect inclination quantity of optical disc with respect to the optical axis of an optical pick-up (object lens) to control the optical pick-up by skew servo mechanism so that the optical axis of the object lens is perpendicular to the signal recording surface of the optical disc in accordance with this inclination quantity.

For example, as shown in FIG. 1 of the Japanese Patent Publication Laid Open No. 1997-161291, a conventional skew sensor comprises a light emitting element comprised of LED disposed at the body portion of the optical pick-up so that light is irradiated toward the signal recording surface of the optical disc, and bisected photo-diodes disposed at the body portion of the optical pick-up and serving to receive light reflected at the signal recording surface of the optical disc thus to take out a difference signal corresponding to inclination quantity of the optical recording medium from the both photo-diodes to detect this difference signal as a skew signal, and to control the skew servo mechanism by this skew signal so that the optical axis of the optical pick-up (optical axis of the object lens) is perpendicular to the signal recording surface of the optical recording medium.

In the conventional skew sensor as described above, since the light emitting element and the photo-diodes which are dedicated for skew detection are required, there is the problem that the number of parts is increased so that cost of the optical pick-up is increased.

Further, in the conventional skew sensor, since difference between output signals of bisected photo-diodes is taken out to thereby detect inclination quantity of the optical disc, when distance between the optical disc and the skew sensor changes, even if inclination quantity of the optical disc is the same, light quantity distribution of beams on the photo-diode for skew detection changes. As a result, error might take place in the inclination quantity of the optical disc.

In addition, since the distance between the optical disc and the skew sensor changes in dependency upon the kind of optical disc like CD or DVD, etc., the state of chucking with respect to turn table of the optical disc, and/or way of warping of the optical disc, etc., such distance changes at all times. For this reason, error is included at all times in an output of a light detection element under such circumstances so that precise skew detection becomes difficult.

DISCLOSURE OF THE INVENTION

In view of the above, if skew information can be detected by an optical system for recording/reproduction without using skew sensor of different structure as described above, it is possible to detect skew signal through lens and light detecting element of the optical system actually used for read/write operation. Thus, precise skew detection which does not include error can be made.

The present invention has been made in order to solve the conventional problems as described above, and its object is to provide a skew detection method, and an optical pick-up and an optical disc apparatus which use skew detecting device in which there is employed a configuration such that inclination direction and inclination quantity of an optical recording medium can be detected by making use of the optical system for recording/reproduction of the optical recording medium to thereby permit radial skew detection of high accuracy and to reduce the number of components to permit realization of low cost.

The skew detection method according to the present invention is directed to a skew detection method of detecting inclination of an optical recording medium including wobble grooves for light spot guide, and comprising: separating light beams from a light source into one main spot and two side spots to irradiate those spots onto a signal recording surface of the optical recording medium; detecting, by light detecting means, reflected light beams respectively corresponding to the main spot and the two side spots which are reflected from the signal recording surface; detecting phase errors between wobble signal obtained as the result of the fact that reflected light beams from the main spot are received and wobble signal every side spot obtained as the result of the fact that reflected light beams from the respective side spots are received when tracking servo is performed along the wobble grooves of the optical recording medium; and generating a skew signal including inclination direction and inclination quantity of the optical recording medium from difference between the both phase errors.

Moreover, another skew detection method according to the present invention is directed to a skew detection method of detecting inclination of an optical recording medium including wobble grooves for light spot guide, and comprising: separating light beams from a light source into one main spot and two side spots to irradiate those spots onto a signal recording surface of the optical recording medium; detecting, by light detecting means, reflected light beams respectively corresponding to the main spot and the two side spots which are reflected from the signal recording surface; respectively detecting wobble signals outputted every side spot from the light detecting means as the result of the fact that reflected light beams corresponding to the two side spots are received when tracking servo is performed along the wobble grooves of the optical recording medium; implementing phase locked loop processing to the respective wobble signals to detect phase errors between those wobble signals to thereby detect phase error amplitudes; and generating a skew signal including inclination direction and inclination quantity of the optical recording medium from difference between the phase error amplitudes.

Further, the optical pick-up according to the present invention is directed to an optical pick-up comprising: a light source for emitting light beams for recording or reproduction, light beam separating means for separating light beams from the light source into one main spot and two side spots to emit those spots; converging means for respectively converging the main spot and the side spots which have been separated by the light beam separating means to irradiate those spots onto the optical recording medium; light separating means for separating light beams onto the optical recording medium which have been emitted from the light source and reflected light beams from the optical recording medium; light detecting means for receiving reflected light beams corresponding to the main spot and the respective side spots which have been separated by the light separating means; and a skew detecting device for detecting inclination of the optical recording medium with respect to the optical axis of light beams for recording/reproduction which are irradiated onto the optical recording medium, wherein the skew detecting device comprises: first and second phase comparison means for respectively comparing and detecting, when tracking servo is performed along wobble grooves of the optical recording medium, phase errors between wobble signal outputted from the light detecting means as the result of the fact that reflected light beams corresponding to main spot are received and wobble signals outputted every side spot from the light detecting means as the result of the fact that reflected light beams corresponding to respective side spots are received; and difference calculating means for calculating difference between the both phase errors which are outputted from the first and second phase comparison means to generate, from the difference, a skew signal including inclination direction and inclination quantity of the optical recording medium.

Further, another optical pick-up according to the present invention is directed to an optical pick-up including a light source for emitting light beams for recording or reproduction, light beam separating means for separating light beams from the light source into one main spot and two side spots to emit those spots, converging means for respectively converging the main spot and the side spots which have been separated by the light beams separating means to irradiate those spots onto an optical recording medium, light separating means for separating light beams onto the optical recording medium which have been emitted from the light source and reflected light beams from the optical recording medium, light detecting means for receiving reflected light beams corresponding to the main spot and the respective side spots which have been separated by the light separating means, and a skew detecting device for detecting inclination of the optical recording medium with respect to the optical axis of light beams for recording/reproduction which are irradiated onto the optical recording medium, wherein the skew detecting device comprises first and second wobble signal detecting means for respectively detecting wobble signals outputted every side spot from the light detecting means as the result of the fact that reflected light beams corresponding to two side spots are received when tracking servo is performed along the wobble grooves of the optical recording medium, first and second amplitude detecting means for implementing phase locked loop processing to wobble signals detected by the first and second wobble signal detecting means to detect phase error between those wobble signals to thereby detect phase error amplitudes, and difference calculating means for calculating difference between the both phase error amplitudes detected by the first and second amplitude detecting means to generate, from the difference, a skew signal including inclination direction and inclination quantity of the optical recording medium.

Further, the optical disc apparatus according to the present invention is directed to an optical disc apparatus including: drive means for rotationally driving an optical recording medium; an optical pick-up including a light source for emitting light beams for recording or reproduction, light beam separating means for separating light beams from the light source into one main spot and two side spots, converging means for converging the main spot and the side spots which have been separated by the light beam separating means to irradiate those spots onto the optical recording medium, light separating means for separating light beams onto the optical recording medium which have been emitted from the light source and reflected light beams from the optical recording medium, light detecting means for receiving reflected light beams corresponding to the main spot and the respective side spots which have been separated by the light separating means; control means for controlling rotation of the optical recording medium and movement of the optical pick-up in correspondence with recording and/or reproducing operations; and signal processing means for performing signal processing of recording and/or reproducing operations with respect to the optical recording medium by the optical pick-up, and a skew detecting device for detecting inclination of the optical recording means with respect to the optical axis of light beams for recording/reproduction which are irradiated onto the optical recording medium, wherein the skew detecting device comprises first and second phase comparing means for respectively comparing and detecting phase errors between wobble signal outputted from the light detecting means as the result of the fact that reflected light beams corresponding to main spot are received and wobble signals outputted every side spot from the light detecting means as the result of the fact that reflected light beams corresponding to the respective side spots are received when tracking servo is performed along the wobble grooves of the optical recording medium, and difference calculating means for calculating difference between both phase errors which are outputted from the first and second phase comparing means to generate, from the difference, a skew signal including inclination direction and inclination quantity of the optical recording medium.

Further, another optical disc apparatus according to the present invention is directed to an optical disc apparatus including: drive means for rotationally driving an optical recording medium; an optical pick-up including a light source for emitting light beams for recording or reproduction, light beam separating means for separating light beams from the light source into one main spot and two side spots to emit those spots, converging means for converging the main spot and the side spots which have been separated by the light beam separating means to irradiate those spots onto the optical recording medium, light separating means for separating light beams onto the optical recording medium which have been emitted from the light source and reflected light beams from the optical recording medium, and light detecting means for receiving reflected light beams corresponding to the main spot and the respective side spots which have been separated by the light separating means; control means for controlling rotation of the optical recording medium and movement of the optical pick-up in correspondence with recording and/or reproducing operations; and signal processing means for performing signal processing of recording and/or reproducing operations with respect to the optical recording medium by the optical pick-up, and a skew detecting device for detecting inclination of the optical recording medium with respect to the optical axis of light beams for recording/reproduction which are irradiated onto the optical recording medium, wherein the skew detecting device comprises first and second amplitude detecting means for implementing phase locked loop processing to wobble signals detected by the first and second signal detecting means when tracking servo is performed along wobble grooves of the optical recording medium to detect phase errors between those wobble signals to thereby detect phase error amplitudes, and difference calculating means for calculating difference between both phase error amplitudes which have been detected by the first and second amplitude detecting means to generate, from the difference, a skew signal including inclination direction and inclination quantity of the optical recording medium.

Still further objects of the present invention and practical merits obtained by the present invention will become more apparent from the description of the embodiments which will be given below.

BEST MODE FOR CARRYING OUT THE INVENTION

Explanation will now be given in detail with reference to the attached drawings in connection with embodiments of a skew detection method, and an optical pick-up and an optical disc apparatus using a skew detecting device according to the present invention.

Figure 1:
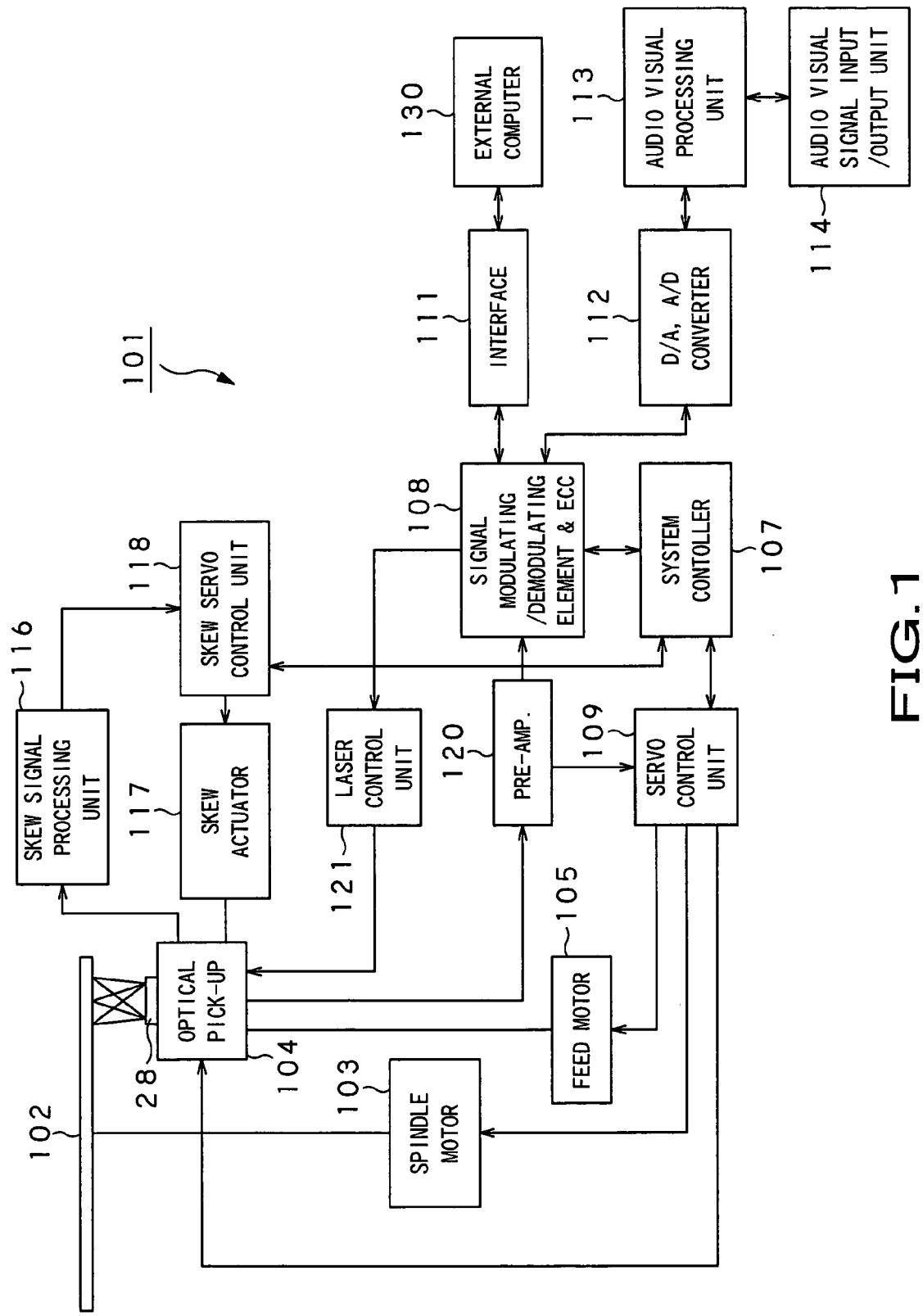
FIG. 1 is a block diagram showing the configuration of an optical disc apparatus provided with optical pick-up according to the present invention.
Figure 2:
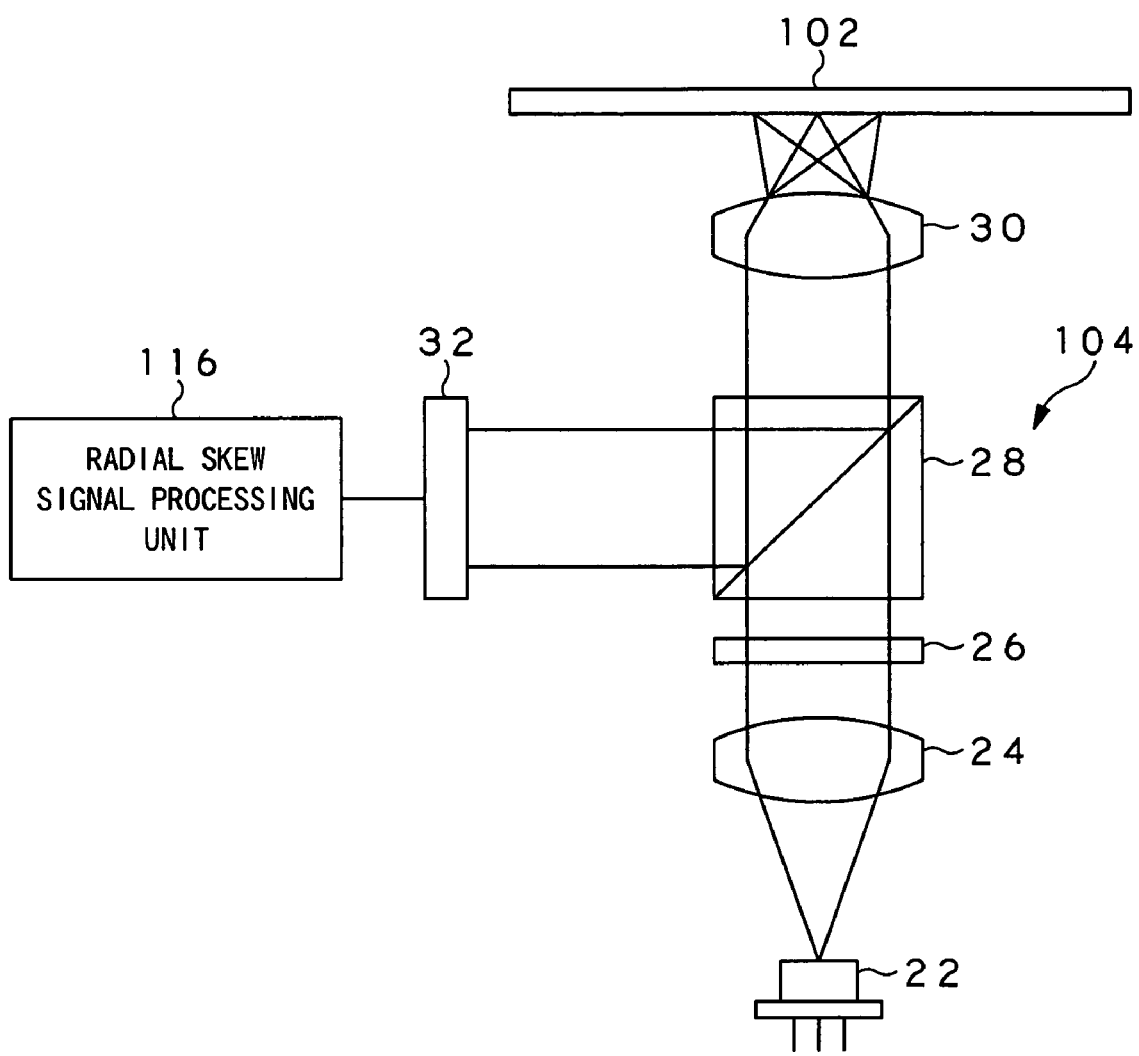
FIG. 2 is a view showing the configuration of the optical pick-up according to the present invention.
Figure 3:
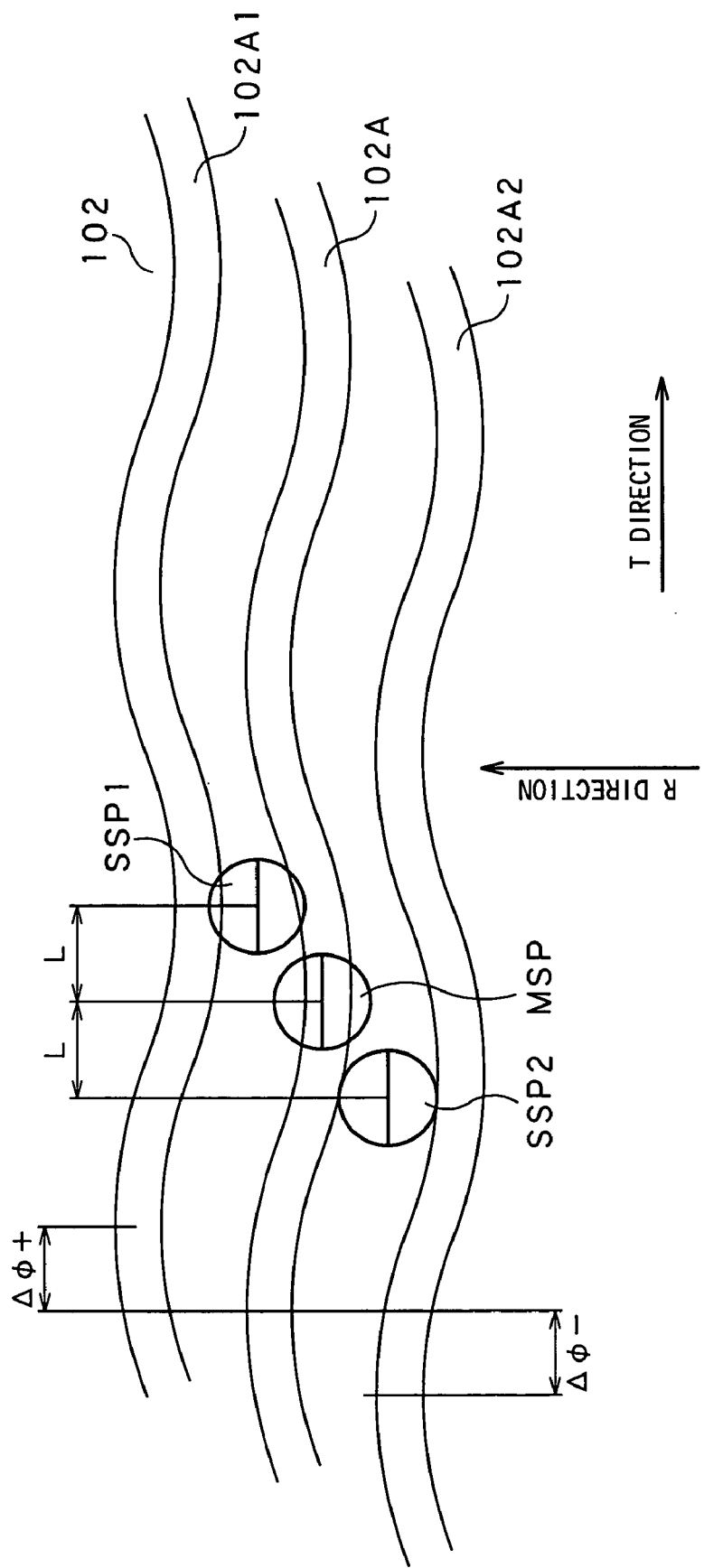
FIG. 3 is an explanatory view showing the relationship between wobble grooves and main and side spots which is applied to radial skew detection of the present invention.
Figure 4:
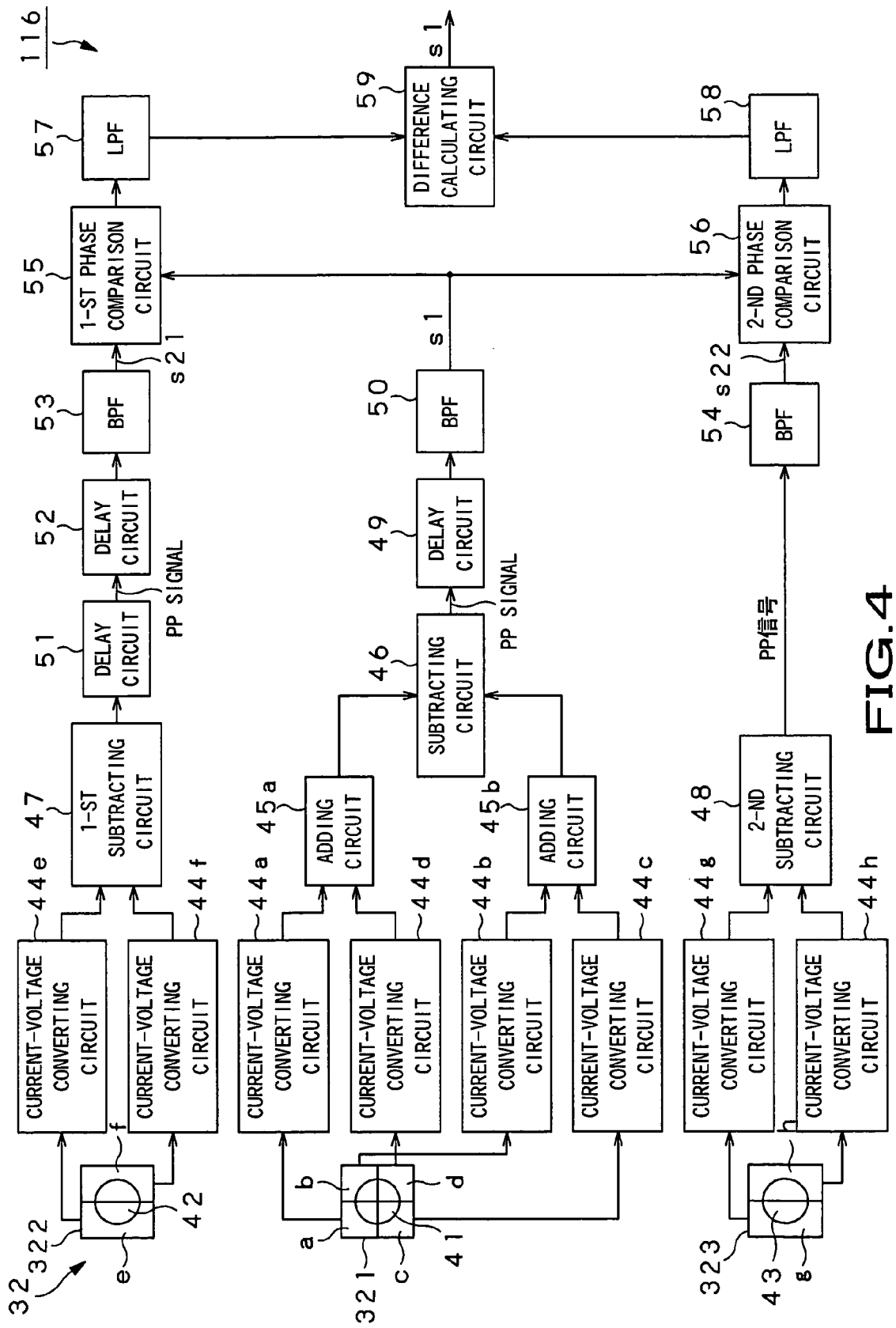
FIG. 4 is a block diagram showing the configuration of skew detecting device in the first embodiment of the present invention.
Figure 5:
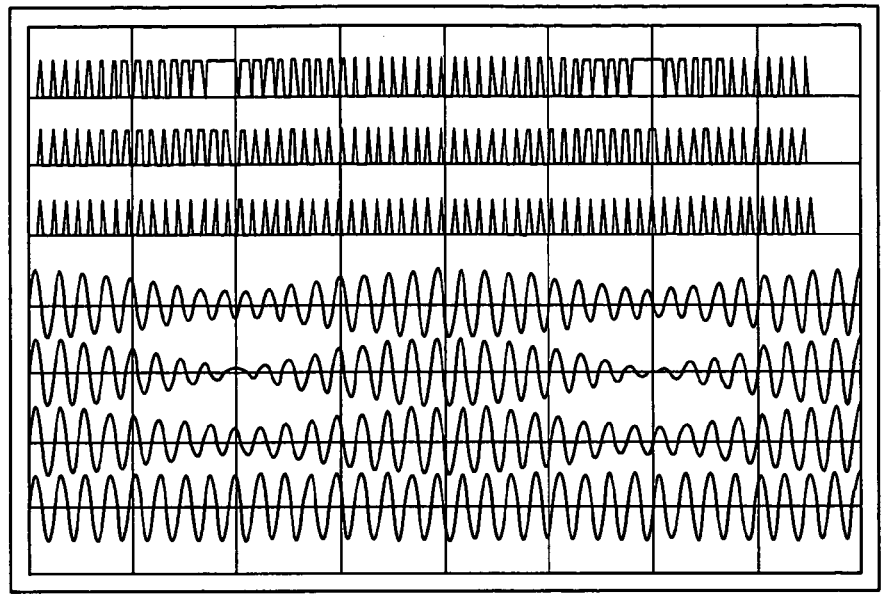
FIGS. 5A to 5G are waveform diagrams for explanation of wobble signal when main spot and side spots in the skew detecting device of the present invention perform tracking of wobble grooves on the optical recording medium.
Figure 6:
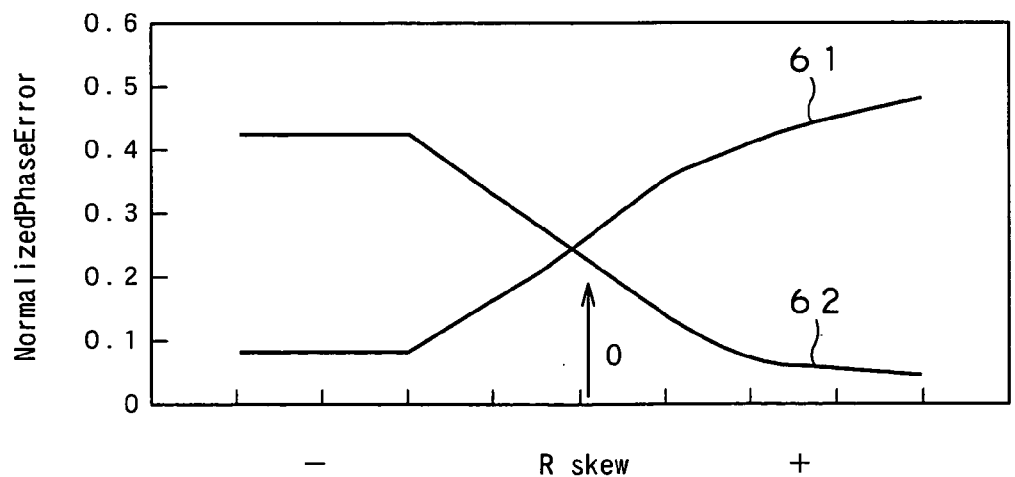
FIG. 6 is a graph showing the relationship between radial skew and phase error of the skew detecting device in the first embodiment of the present invention.

FIG. 1 is a block diagram showing the configuration of the first embodiment of an optical disc apparatus provided with an optical pick-up using a skew detecting device according to the present invention, FIG. 2 is a view showing the configuration of optical pick-up doubling as skew detection according to the present invention, FIG. 3 is an explanatory view showing the relationship between wobble grooves and main and side spots which are applied to radial skew detection of the present invention, FIG. 4 is a block diagram showing the configuration of skew detecting device in the embodiment of the present invention, FIG. 5 is a waveform diagram for explanation of wobble signal when main spot and side spots in the skew detecting device of the present invention performs tracking of wobble grooves on the optical recording medium, and FIG. 6 is a graph showing the relationship between radial skew and phase error of the skew detecting device in the embodiment of the present invention. In this case, the optical disc apparatus shown in FIG. 1 is an example of a recording/reproducing apparatus within which skew detecting device and optical pick-up which will be explained below can be mounted.

First, explanation will be given in connection with the configuration of the optical disc apparatus 101 shown in FIG. 1.

This optical disc apparatus 101 comprises a spindle motor 103 as drive means for rotationally driving an optical disc 102 which is optical recording medium like DVD-R, DVD-RW, DVD+R, DVD+RW, CD-R or CD-RW, an optical pick-up 104, and a feed motor 105 as drive means for moving this optical pick-up 104 in the radial direction of the optical disc 102.

Here, the spindle motor 103 and the feed motor 105 have configuration such that they are driven and controlled at a predetermined number of rotations by a servo control unit 109 controlled on the basis of command from a system controller 107.

A signal modulating/demodulating element & ECC block 108 shown in FIG. 1 performs modulation/demodulation of signal, and addition of ECC (Error Correcting Code).

The optical pick-up 104 is caused to be of the configuration such that light beams from the light source are irradiated onto the signal recording surface of the rotating optical disc 102 in accordance with command of the signal modulating/demodulating element & ECC block 108 in the state where they are separated into one main spot for recording/reproduction and two side spots for tracking. Further, the optical pick-up 104 is caused to be of the configuration to deliver various signals outputted from light detecting means (which will be described later) of the optical pick-up 104 to a pre-amplifier 120 and a radial skew signal processing unit 116 in accordance with reflected light beams corresponding to the main spot and the side spots which have been reflected from the signal recording surface of the optical disc 102.

The preamplifier 120 is caused to be of the configuration so as to have ability to generate focus error signal, tracking error signal and/or RF signal, etc. on the basis of various signals outputted from light detecting means (which will be described later) of the optical pick-up 104 in correspondence with the main spot and the side spots. In addition, predetermined processing such as demodulation and error correcting processing, etc. based on signals from the servo control unit 109 and the signal modulating/demodulating element & ECC block 108, etc. are performed by those circuit components in accordance with kind of recording medium to be reproduced.

Here, recording signal demodulated by the signal modulating/demodulating element & ECC block 108 is, e.g., signal for data storage of computer, such recording signal is sent to an external computer 130, etc. through an interface 111. Thus, the external computer 130, etc. is caused to be of the configuration so as to have ability to receive signal recorded on the optical disc 102 as a reproduction signal.

Moreover, if recording signal demodulated by the signal modulating/demodulating element & ECC block 108 is signal for audio/visual, such recording signal is caused to undergo digital/analog conversion at D/A converting unit of a D/A, A/D converter 112, and is delivered to an audio/visual processing unit 113. Further, audio/visual signal processing is performed at this audio/visual processing unit 113. The signal thus obtained is transmitted to external image pick-up/projector equipment through an audio/visual signal input/output unit 114.

At the optical pick-up 104, the feed motor 105 for moving it up to, e.g., a predetermined recording track on the optical disc 102 is connected thereto. The control of the spindle motor 103, the control of the feed motor 105, and controls in the focusing direction and in the tracking direction of the biaxial actuator which holds object lens of the optical pick-up 104 are respectively performed by the servo control unit 109.

In addition, a laser control unit 121 serves to control a laser light source 22 at the optical pick-up 104, and is caused to be of the configuration to control output power of the laser light source 22 at the time of recording mode and at the time of reproduction mode. Additionally, the laser light source 22 will be described later.

The radial skew signal processing unit 116 serves to detect phase errors between signal outputted from light detecting means (which will be described later) of the optical pick-up 104, i.e., wobble signal outputted from the light detecting means as the result of the fact that reflected light beams corresponding to main spot are received when tracking servo is performed along wobble grooves formed at the optical disc 102 and wobble signal outputted every side spot from the light detecting means as the result of the fact that reflected light beams corresponding to side spot are received, and to generate a skew signal S1 including inclination direction and inclination quantity of the optical disc 102 from difference between the both phase errors.

The skew signal S1 outputted from the radial skew signal processing unit 116 is adapted to be delivered to a skew actuator 117 serving as drive means for skew for fluctuating the optical pick-up 104 so that its optical axis (optical axis of the object lens) is perpendicular to the signal recording surface of the optical disc 102, and this skew actuator 117 comprises a skew servo control unit 118 (corresponding to the skew control means described in the claim) which is driven and controlled on the basis of skew signal from the radial skew signal processing unit 116. The skew servo control unit 118 is caused to be of the configuration so that it can be controlled also on the basis of control command from the system controller 107.

Then, the configuration of the optical pick-up 104 according to the present invention will be explained by FIG. 2.

The optical pick-up 104 comprises, as shown in FIG. 2, laser light source 22 for emitting light beams for recording/reproduction, a collimator lens 24 disposed in the light beam emitting direction of the laser light source 22 and serving to change the light beams into parallel light, a grating 26 for separating the parallel light beams into one main spot and two side spots, a beam splitter 28 disposed at the light emitting side of the grating 26, an object lens (light converging means) 30 for converging light beams of three spots which have been transmitted through the beam splitter 28 to irradiate those light beams onto the optical disc 102, and light detecting means 32 disposed in a manner opposite to reflection direction of the beam splitter 28 and serving to receive reflected light beams from the optical disc 102 which have been separated at the beam splitter 28 to convert them into electric signal, and is caused to be of the configuration in which these respective optical parts (components) are mounted at holder body (not shown).

In FIG. 3, the main spot MSP converged onto the signal recording surface of the optical disc 102 is disposed on wobble groove 102A formed at the optical disc 102. Two side spots SSP1, SSP2 are disposed in the state spaced by a predetermined interval L in T (tangential) direction along the wobble groove 102A of the optical disc 102 with respect to the main spot MSP so that the main spot MSP is put therebetween, and respective side spots SSP1, SSP2 are disposed in the state respectively shifted by ½ track in R (radial) direction which traverses the wobble groove 102A with respect to the main spot MSP in such a manner that the main spot MSP is put therebetween.

Then, the configuration of radial skew signal processing unit 116 including photo-detector for detecting wobble signal which constitutes the skew detecting device according to the present invention will be explained by FIG. 4.

As the photo-detector for detecting wobble signal in the skew detecting device, there is used light detecting means 32 shown in FIG. 2 which is used for generation of signals of focus error, tracking error and RF.

As shown in FIG. 4, this light detecting means 32 is composed of a main light receiving section 321 comprised of light receiving elements a, b, c, d quadrisected in a form of Japanese character, which means rice field, which is adapted for receiving reflected light beams from the optical disc 102 in correspondence with the main spot MSP, a first sub-light receiving section 322 comprised of light receiving elements e, f bisected in the radial direction which is adapted for receiving reflected light beams from the optical disc 102 in correspondence with the side spot SSP1, and a second sub-light receiving section 323 comprised of light receiving elements g, h bisected in the radial direction which is adapted for receiving reflected light beams from the optical disc 102 in correspondence with the side spot SSP2.

The radial skew signal processing unit 116 comprises, as shown in FIG. 4, current-voltage converting circuits 44a~44d for separately converting currents flowing at respective light receiving elements a, b, c, d of the main light receiving section 321 into voltages in accordance with irradiation area of reflected light beams 41 corresponding to the main spot MSP, current-voltage converting circuits 44e, 44f every light receiving element which separately convert currents flowing at respective light receiving elements e, f of the first sub-light receiving section 322 into voltages in accordance with irradiation area of reflected light beams 42 corresponding to the side spot SSP1, current-voltage converting circuits 44g, 44h every light receiving element which separately convert currents flowing at respective light receiving elements g, h of the second sub-light receiving section 323 into voltages in accordance with irradiation area of reflected light beams 43 corresponding to the side spot SSP2, an adding circuit 45a for adding output voltages of the current-voltage converting circuits 44a and 44d, an adding circuit 45b for adding output voltages of the current-voltage converting circuits 44b and 44c, a subtracting circuit 46 for determining a push-pull signal from difference output between the adding circuits 45a and 45b, a first subtracting circuit 47 for determining a push-pull signal (PP signal) from difference output between the current-voltage converting circuits 44e and 44f, and a second subtracting circuit 48 for determining a push-pull signal from difference output between the current-voltage converting circuits 44g and 44h.

Moreover, at the output side of the subtracting circuit 46, a delay circuit 49 for delaying push-pull signal by time corresponding to interval L between main spot MSP and side spot SSP1 by the side spot SSP2 shown in FIG. 3 and a BPF (Band Pass Filter) 50 for passing the component of main wobble signal s1 from the push-pull signal delayed at the delay circuit 49 are connected in series.

Further, at the output side of the subtracting circuit 47, first and second delay circuits 51, 52 for delaying push-pull signal by time corresponding to double value of time interval L between main spot MSP and side spot SSP2 by the side spot SSP2 shown in FIG. 3 and a BPF (Band Pass Filter) 53 for passing the component of side wobble signal s21 from the push-pull signal delayed at the delay circuits 51, 52 are connected in series.

Further, at the output side of the subtracting circuit 48, a BPF (Band Pass Filter) 54 for passing side wobble signal s22 from the push-pull signal is connected in series.

Further, in FIG. 4, at the output side of the BPF (Band Pass Filter) 53, a first phase comparison circuit 55 such as EX-OR, etc. which compares main wobble signal s1 and side wobble signal s21 to detect phase error is connected. Further, at the output side of the BPF (Band Pass Filter) 54, a second phase comparison circuit 56 such as EX-OR, etc. which compares main wobble signal s1 and side wobble signal s22 to detect phase error is connected. Phase errors detected at the first phase comparison circuit 55 and the second phase comparison circuit 56 are average phase error quantity changing in accordance with skew.

Further, at the output side of the first phase comparison circuit 55 and the second phase comparison circuit 56, a difference calculating circuit 59 is connected through LPFs (Low Pass Filters) 57, 58. This difference calculating circuit 59 serves to calculate difference between phase errors detected at the first phase comparison circuit 55 and the second phase comparison circuit 56 to generate, from the difference, a skew signal S1 including inclination direction and inclination quantity of the optical disc 102. This skew signal S1 is outputted to skew servo control unit 118 as shown in FIG. 1.

Then, the skew detecting method by the skew detecting device shown in the first embodiment constituted in a manner as described above and the operation thereof will be explained.

Radial skew detection of the optical disc 102 is performed by making use of optical pick-up 104 of the optical disc apparatus shown in FIG. 1. Namely, light beams emitted from laser light source 22 are converted into parallel light beams by collimator lens 24. Further, the parallel light beams are separated into one main spot and two side spots by grating 26, and are then transmitted through beam splitter 28. The light beams thus transmitted are converged by object lens 30, and are irradiated onto the signal recording surface of the optical disc 102. At this time, as shown in FIG. 3, main spot MSP of light beams which have been separated into three spots is disposed on wobble groove 102A of the optical disc 102, and two side spots SSP1, SSP2 are disposed in the state shifted by ½ track in the radial direction which traverses wobble groove 102A.

On the other hand, reflected light beams corresponding to three spots reflected on the signal recording surface of the optical disc 102 are transmitted through object lens 30, and are then reflected by beam splitter 28. The reflected light beams are incident on light detecting means 32. The incident light beams thus obtained are converted into electric signal by the light detecting means 32.

At the optical disc 102 of the standard like DVD-R, DVD-RW, DVD+R, DVD+RW, CD-R or CD-RW, address information of the optical disc 102 is included in a form of wobble address such that grooves are wobbled. In addition, markers recorded onto the optical disc 102 are recorded at CLV (Constant Linear Velocity) so that they have predetermined size (length) at all times, and carrier frequency of wobble address is also synchronized with clock frequency of information (mark) recorded on the optical disc 102. For this reason, wobble grooves formed at the signal recording surface of the optical disc 102 is recorded also at CLV. Accordingly, period of wobbles has predetermined length within the optical disc surface, and adjacent wobble grooves are necessarily shifted by a certain phase.

For example, as shown in FIG. 3, wobble groove 102A and wobble grooves 102A1 and 102A2 which are respectively adjacent at the outside and the inside of the wobble groove 102A are respectively shifted by phases of ΔΦ+ and ΔΦ−. This shift quantity of phase results in remainder obtained by dividing length of one circumference of wobble groove by wobble period every track.

Since wobble period is shifted every track in a manner as stated above, it looks that phases of the wobble grooves 102A1 and 102A2 which are adjacent to the wobble groove 102A change (fluctuate) at a certain time period. In addition, this shift quantity (period) changes (fluctuates) in dependency upon position in the radial direction.

Here, when it is assumed that the optical pick-up 104 is controlled by servo control unit 109 in such a manner that tracking is performed in the state where main spot MSP is disposed at the middle wobble groove 102A shown in FIG. 3, reflected light beams 41 corresponding to the main spot MSP disposed on the wobble groove 102A are incident on main light receiving section 321 of the light detecting means 32, and reflected light beams 42, 43 corresponding to side spots SSP1, SSP2 located at positions shifted by half track from the wobble groove 102A are respectively incident on the first sub-light receiving section 322 and the second sub-light receiving section 323.

Followed by this, a main wobble signal s1 obtained through the current-voltage converting circuits 44a~44d, the adding circuits 45a, 45b, the subtracting circuit 46, the delay circuit 49 and the BPF 50 from the light receiving elements a, b, c, d of the main light receiving section 321 has a waveform as shown in FIG. 5G.

Moreover, a wobble signal s21 when radial skew Rskew of the optical disc 102 is equal to zero which is obtained through the current-voltage converting circuits 44e, 44f, the first subtracting circuit 47, the delay circuits 51, 52 and the BPF 53 from respective light receiving elements e, f of the first sub-light receiving section 322 has a waveform as shown in FIG. 5E, and a side wobble signal s21 when the radial skew Rskew of the optical disc 102 indicates + has a waveform as shown in FIG. 5D, and a side wobble signal s21 when the radial skew Rskew of the optical disc 102 indicates − has a waveform as shown in FIG. 5F.

Further, side wobble signal s22 when the radial skew Rskew of the optical disc 102 is equal to zero which is obtained through the current-voltage converting circuits 44g, 44h, the second subtracting circuit 48 and the BPF 54 from respective light receiving elements g, h of the second sub-light receiving section 323 has a waveform as shown in FIG. 5E, a side wobble signal s22 when the radial skew Rskew of the optical disc 102 indicates + has a waveform as shown in FIG. 5F, and a side wobble signal s22 when the radial skew Rskew of the optical disc 102 indicates − has a waveform as shown in FIG. 5D.

Further, a phase error between main wobble signal s1 and side wobble signal s21 which is outputted from first phase comparison circuit 55 when the radial skew Rskew of the optical disc 102 is equal to zero has a waveform as shown in FIG. 5B, phase error when the radial skew Rskew of the optical disc 102 indicates + has a waveform as shown in FIG. 5A, and phase error when the radial skew Rskew of the optical disc 102 indicates − has a waveform as shown in FIG. 5C.

Further, a phase error between main wobble signal s1 and side wobble signal s21 which is outputted from second phase comparison circuit 56 when the radial skew Rskew of the optical disc 102 is equal to zero has a waveform as shown in FIG. 5B, phase error when the radial skew Rskew of the optical disc 102 indicates + has a waveform as shown in FIG. 5C, and phase error when the radial skew Rskew of the optical disc 102 indicates − has a waveform as shown in FIG. 5A.

In the case where wobbles are read out by side spots SSP1, SSP2 located at the position shifted by half track from the wobble groove 102A, phases modulated at both sides of land are different from each other. For this reason, when the side spots SSP1, SSP2 are not inclined in the radial direction, contributions of the wobble grooves 102A1 and 102A2 of both sides are equal to each other. Accordingly, a push-push signal to be reproduced results in a signal as subtraction between both wobble signals. Thus, as shown in FIG. 5, amplitude of wobble is modulated by period in which phase difference with respect to adjacent wobble is circulated. In addition, in the case where skew exists in the radial direction, contributions of wobbles of both sides with respect to side spots SSP1, SSP2 change. For this reason, amplitude modulation degree resultantly changes in the push-pull signal. Thus, phase of wobble also changes.

For example, when the optical disc 102 is inclined so that form of the side spot SSP1 is deformed in the direction where intensity becomes strong toward the main spot MPS side, since main wobble component included in detected wobble signal is increased, phase change quantity becomes small. In addition, when the optical disc 102 is inclined in the direction opposite to the above, adjacent wobble component is increased so that phase change quantity becomes large. At the side spot SSP2 of the opposite side, contribution of inclination becomes opposite. Namely, in the case where contribution of wobble of the main spot side is large at one side spot, contribution of adjacent wobble becomes large at the other side spot.

Accordingly, phases of main wobble signal s1 detected at push-pull signal of main spot and side wobble signals s21 and s22 detected at the side spot are compared to thereby detect change quantity of phase with respect to main wobble to compare this change quantity with respect to both side spots, thereby making it possible to recognize direction and quantity of radial skew by the magnitude of phase change quantity.

In FIG. 6, curve 61 represents output change of phase error with respect to the radial skew Rskew after passed through LPF, and curve 62 represents output change of phase error with respect to radial skew Rskew after passed through LPF 58.

In a manner stated above, difference between phase errors which have been detected at first phase comparison circuit 55 and second phase comparison circuit 56 of the radial skew signal processing unit 116 is calculated by difference calculating circuit 59 to generate, from the difference, a skew signal S1 including inclination direction and inclination quantity of the optical disc 102 to input this skew signal S1 to skew servo control unit 118 shown in FIG. 1 to drive and control skew actuator 117 to thereby operate the optical pick-up 104 so that the optical axis of the optical pick-up 104, i.e., the optical axis of the object lens 30 is perpendicular to the signal recording surface of the optical disc 102. Namely, the entirety of the optical pickup 104 is caused to be in correspondence with inclination of the optical disc 102 to thereby hold the state where the optical axis of the object lens 30 and the signal recording surface of the optical disc 102 are perpendicular to each other. Thus, it is possible to prevent that d.c. offset takes place in tracking error signal by inclination of the optical pick-up 104.

Moreover, at the optical pick-up 104 shown in the embodiment, at the time of recording onto the optical disc 102 like DVD-R, DVD-RW, DVD+R, DVD+RW, CD-R or CD-RW, light beams having large power of abour 30 mW changing in accordance with recording signal is generated from laser light source 22. The light beams thus generated are converted into parallel light beams by collimator lens 24. Further, the parallel light beams thus obtained are separated into one main spot and two side spots by grating 26, and are then transmitted through beam splitter 28. The spots thus transmitted are converged by object lens 30 and are irradiated onto the signal recording surface of the optical disc 102. Thus, the recording film of the optical disc is altered (changed in quality) to record signals onto the optical disc 102.

Further, reflected light beams reflected from the optical disc 102 are transmitted through object lens 30, and are then reflected by beam splitter 28. The reflected light beams thus obtained are incident on light detecting means 32. Light signal received at the main light receiving section 321 of the light detecting means 32 is converted into electric signal at pre-amplifier 120, and is taken out as focus error signal. Further, light signals received at the first sub-light receiving section 322 and the first sub-light receiving section 323 are converted into electric signal at pre-amplifier 120. The electric signal thus obtained is taken out as tracking error signal.

Further, at the time of reproduction of optical disc 102 like DVD-R, DVD-RW, DVD+R, DVD+RW, CD-R or CD-RW, light beams having a predetermined intensity of about 1 mW are generated from laser light source 22 to irradiate these light beams onto the optical disc 102 by the same optical path as that at the time of recording. Followed by this, reflected light beams reflected from the signal recording surface of the optical disc 102 are transmitted through object lens 30, and are then reflected by beam splitter 28. The reflected light beams thus obtained are incident on light detecting means 32. Light signal received at the main light receiving section 321 of the light detecting means 32 is converted into electric signal at pre-amplifier 120, and is taken out as RF signal or focus error signal. In addition, light signals received at the first sub-light receiving section 322 and the second sub-light receiving section 323 are converted into electric signal at pre-amplifier 120. The electric signal thus obtained is taken out as tracking error signal.

In accordance with the skew detecting device, and optical pick-up 104 and optical disc apparatus 101 using such skew detecting device which are shown in such embodiment, there is employed such a configuration to detect, by making use of optical pick-up 104 for recording/reproduction when tracking servo is performed along wobble grooves of the optical disc 102, phase error between main wobble signal s1 outputted as the result of the fact that reflected light beams corresponding to main spot MSP of the optical disc 102 are received by main light receiving section 321 of light detecting means 32 and side wobble signals s21, s22 outputted every side spot as the result of the fact that reflected light beams corresponding to respective side spots SSP1, SSP2 of the optical disc 102 are received by first sub-light receiving section 322 and second sib-light receiving section 323 to calculate difference between both phase errors by difference calculating circuit 59 to generate, from the difference, a skew signal S1 including inclination direction and inclination quantity of the optical disc 102. Accordingly, since radial skew of the optical disc 102 can be detected at high accuracy, and skew sensor of different structure as in the case of the prior art becomes unnecessary, the number of components is reduced. Thus, the optical pick-up 104 and the optical disc apparatus 101 including the skew detecting device can be realized at low cost.

Further, in accordance with this embodiment, there is employed such a configuration that the main spot MSP converged onto the signal recording surface of the optical disc 102 is disposed on the wobble groove 102A of the optical disc 102, and two side spots SSP1 and SSP2 are disposed in the state spaced by a predetermined interval L in the tangential direction along the wobble groove 102A of the optical disc 102 with respect to the main spot MSP so that the main spot MSP is put therebetween, and the respective side spots SSP1 and SSP2 are disposed in the state shifted by ½ track in the radial direction which traverses the wobble groove 102A with respect to the main spot MSP so that the main spot MSP is put therebetween. Accordingly, it is possible to securely detect radial skew of the optical disc 102 by making use of wobble grooves of the optical disc 102, and it becomes possible to precisely detect skew signal which does not include error.

In addition, in accordance with this embodiment, there is employed configuration that delay circuits for delaying wobble signals are respectively added to the signal processing system for main wobble signal s1 corresponding to main spot MSP and the signal processing system for side wobble signal s21 corresponding to side spot SSP1 so that timings at the time when main wobble signal s1 and side spots SSP1 and SSP2 are compared by the delay circuits are caused to be in correspondence with each other. Accordingly, it is possible to correct delay resulting from the fact that the side spot is away from the main spot in the tangential direction. Thus, it is possible to detect skew signal at higher accuracy.

Then, the second embodiment of a device using the skew detection method according to the present invention will be explained by FIGS. 7 to 9.

Figure 7:
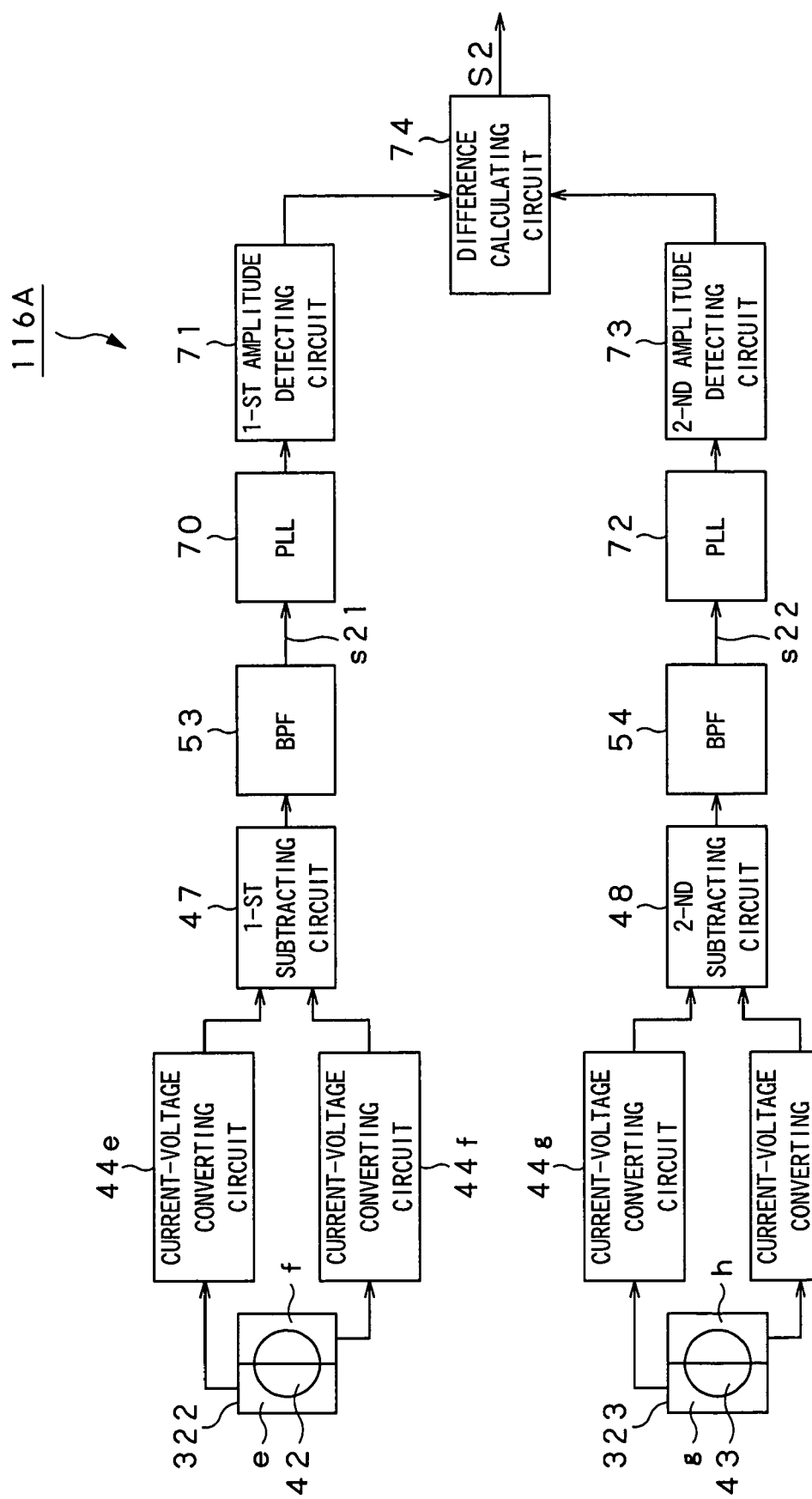
FIG. 7 is a block diagram showing second embodiment of the skew detecting device according to the present invention.

The skew detecting device shown in FIG. 7 is directed to a device in the case where skew detection is performed only by signal by reflected light beams corresponding to side spot.

In the second embodiment, a radial skew signal processing unit 116A includes first sub-light receiving section 322 comprised of light receiving elements e, f bisected in the radial direction which is adapted for receiving reflected light beams from the optical disc 102 in correspondence with side spot SSP1 shown in FIG. 3, and second sub-light receiving section 323 comprised of light receiving elements g, h bisected in the radial direction which is adapted for receiving reflected light beams from the optical disc 102 in correspondence with side spot SSP2.

Moreover, the radial skew signal processing unit 116A comprises current-voltage converting circuits 44e, 44f every light receiving element which are adapted for separately converting currents flowing at respective light receiving elements e, f of the first sub-light receiving section 322 into voltages in accordance with irradiation area of reflected light beams 42 corresponding to the side spot SSP1 shown in FIG. 3, current-voltage converting circuits 44g, 44h every light receiving element which are adapted for separately converting currents flowing at respective light receiving elements g, h of the second sub-light receiving section 323 into voltages in accordance with irradiation area of reflected light beams 43 corresponding to the side spot SSP2 shown in FIG. 3, a first subtracting circuit 47 for determining a push-pull signal (PP signal) from difference output between the current-voltage converting circuits 44e and 44f, and a second subtracting circuit 48 for determining a push-pull signal from difference output between the current-voltage converting circuits 44g and 44h.

Further, at the output side of the first subtracting circuit 47, a BPF (Band Pass Filter) 53 for passing the component of side wobble signal s21 from the push-pull signal is connected in series.

Further, at the output side of the second subtracting circuit 48, a BPF (Band Pass Filter) 54 for passing side wobble signal s22 from the push-pull signal is connected in series.

Further, in FIG. 7, at the output side of the BPF (Band Pass Filter) 53, a PLL 70 for implementing phase locked loop processing to side wobble signal s21 to thereby detect phase error is connected. Further, at the output side of the PLL 70, a first amplitude detecting circuit 71 for detecting phase error amplitude outputted from the PLL 70 is connected. The amplitude of this phase error changes in dependency upon the direction where the optical disc 102 is inclined.

In addition, at the output side of the BPF (Band Pass Filter) 54, a PLL 72 for implementing phase locked loop processing to the side wobble signal s22 to thereby detect phase error is connected. Further, at the output side of the PLL 72, a second amplitude detecting circuit 73 for detecting phase error amplitude outputted from the PLL 72 is connected. The amplitude of this phase error changes in dependency upon the direction where the optical disc 102 is inclined.

A difference calculating circuit 74 shown in FIG. 7 calculates difference between both phase error amplitudes detected at the first amplitude detecting circuit 71 and the second amplitude detecting circuit 73 to generate, from the difference, a skew signal S2 including inclination direction and inclination quantity of the optical disc102. This skew signal S2 is outputted to skew servo control unit 118 as shown in FIG. 1.

In such skew detecting device of the second embodiment, two side spots SSP1 and SSP2 are disposed in the state spaced by a predetermined interval L in the tangential direction along the wobble groove 102A of the optical disc 102 with respect to the main spot MSP in such a manner that the main spot MSP is put therebetween. Difference point between the second embodiment and the first embodiment resides in that the main spot MSP is put in the radial direction which traverses wobble groove 102A from the main spot MSP and distances from the main spot MSP to respective side spots SSP1 and SSP2 are not caused to be the same value.

Figures 8A, 8B, 8C:
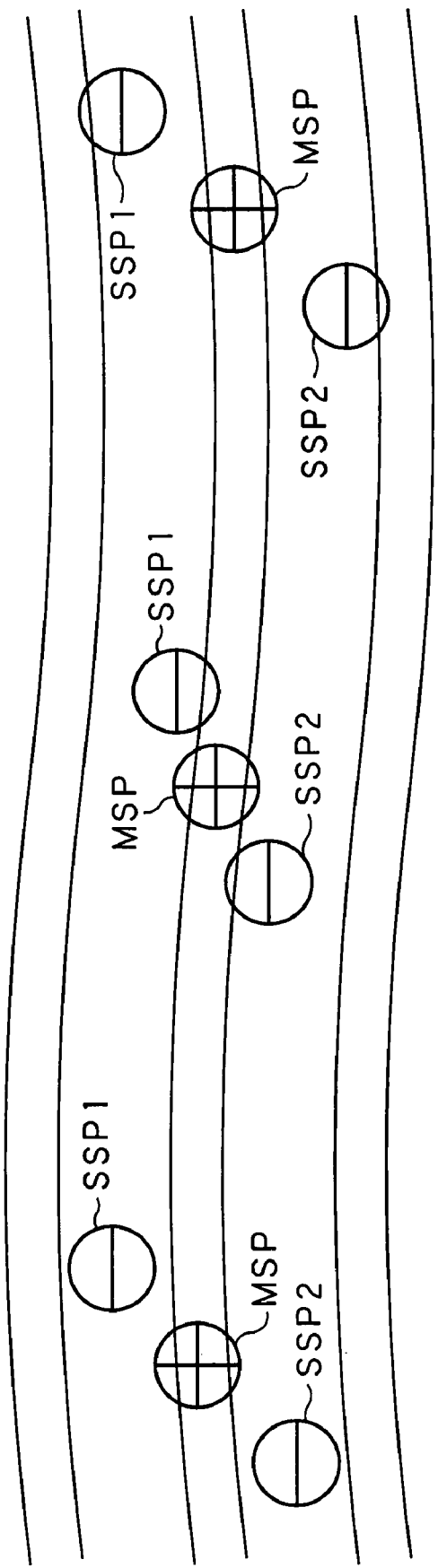
FIG. 8A is an explanatory view when wobble grooves and main and side spots which are applied to radial skew detection in the second embodiment according to the present invention are shifted by ½ track.
FIG. 8B is an explanatory view when wobble grooves and main and side spots which are applied to radial skew detection in the second embodiment according to the present invention are shifted by ¼ track (when shift quantity is narrower than ½ track)
FIG. 8C is an explanatory view when wobble grooves and main and side spots which are applied to radial skew detection in the second embodiment according to the present invention are shifted by ¾ track (shift quantity is broader than ½ track).
Figure 9:
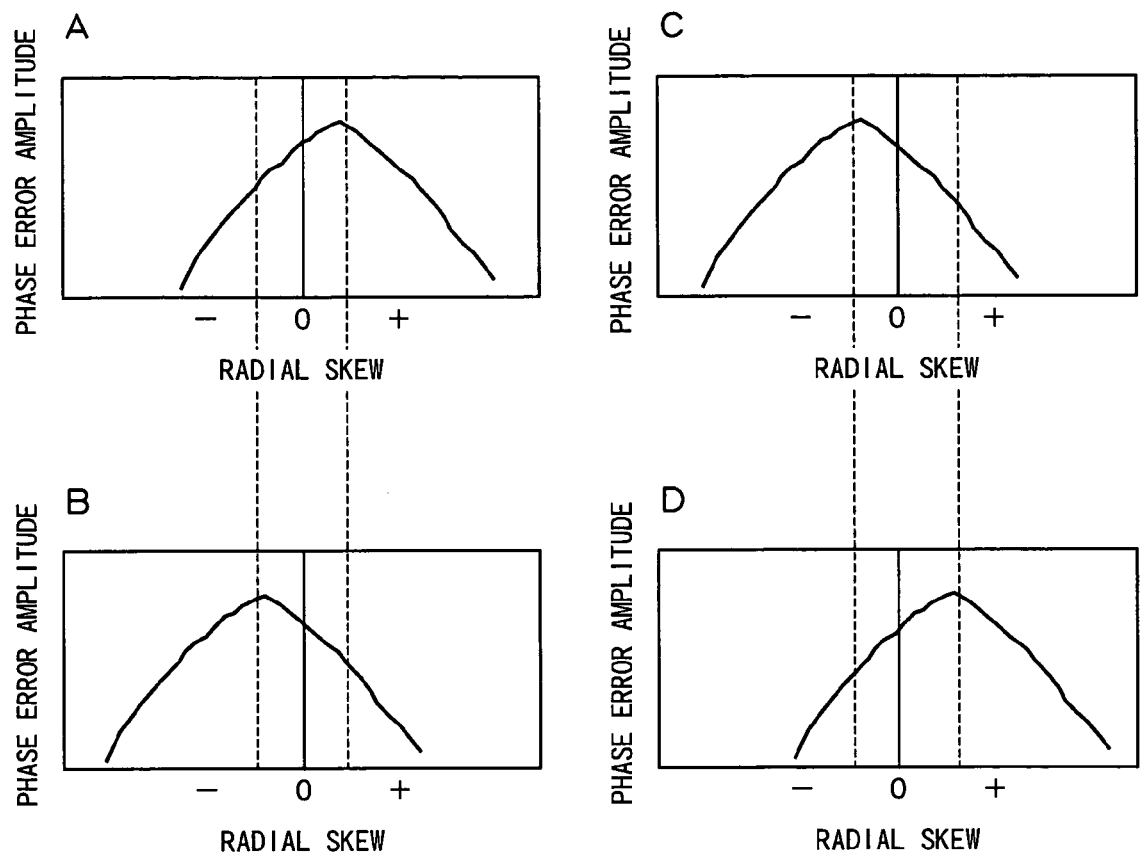
FIGS. 9A to 9D are graphs showing the relationship between radial skew and phase error amplitude of the skew detecting device in the second embodiment of the present invention.

For example, as shown in FIG. 8, respective side spots SSP1 and SSP2 are disposed at a position (FIG. 8B) narrower than the position (FIG. 8A) of ½ track shift, and a position (FIG. 8C) broader than that with respect to the main spot MSP.

In the skew detecting device in such state, reflected light beams 42, 43 corresponding to side spots SSP1 and SSP2 are respectively incident on the first sub-light receiving section 322 and the second sub-light receiving section 323.

Thus, side wobble signal s21 of the optical disc 102 which is obtained after passed through current-voltage converting circuits 44e, 44f, first subtracting circuit 47 and BPF 53 from respective light receiving elements e, f of the first sub-light receiving section 322 is caused to undergo phase locked loop processing at the PLL 70 to thereby detect phase error to detect phase error amplitude by first amplitude detecting circuit 71. Moreover, a side wobble signal s22 of the optical disc 102 which is obtained after passed through current-voltage converting circuits 44g, 44h, second subtracting circuit 48 and BPF 54 from respective light receiving elements g, h of the second sub-light receiving section 323 is caused to undergo phase locked loop processing by PLL 72 to thereby detect phase error to detect phase error amplitude by second amplitude detecting circuit 73.

Such amplitude of phase error changes in dependency upon the direction where the optical disc 102 is inclined. Accordingly, in the case where shift in the radial direction with respect to wobble groove 102A of side spots SSP1 and SSP2 is caused to be broader than, e.g., ½ track shift as shown in FIG. 8C, the relationship between radial skew and phase error amplitude exhibits the characteristic as shown in FIGS. 9A and 9B. The reason why such characteristic is obtained will be described below.

In FIG. 8C, in the case where the radial skew indicates + (plus) direction, shift of gravity of spot and shift from ½ track of spot position are cancelled at the position of side spot SSP1 so that contributions from the wobble tracks are equal to each other. Accordingly, phase error amplitude detected at the first amplitude detecting circuit 71 becomes maximum as shown in FIG. 9A. Therefore, the position of the side spot SSP1 results in the position suitable for skew detection. It is to be noted that contribution of wobble track of one side becomes large at the position of side spot SSP2 so that this position does not result in the position suitable for skew detection.

Moreover, in FIG. 8C, in the case where the radial skew indicates − (minus) direction, shift of gravity of spot and shift from ½ track of the spot position are cancelled at the position of side spot SSP2 so that contributions from wobble tracks are equal to each other. Accordingly, phase error amplitude detected at the second amplitude detecting circuit 73 becomes maximum as shown in FIG. 9B. Therefore, the position of side spot SSP2 results in the position suitable for skew detection. It is to be noted that contribution of wobble track of one side becomes great at the position of side spot SSP1 so that this position does not result in the position suitable for skew detection.

Further, in the case where shift in the radial direction with respect to the wobble groove 102A of the side spots SSP1 and SSP2 is caused to be narrower than ½ track shift in a manner opposite to the above, the relationship between radial skew and phase error amplitude of (FIG. 8B) exhibits the characteristic as shown in FIGS. 9C and 9D. The reason why such characteristic is obtained will be described below.

In FIG. 8B, in the case where the radial skew indicates − direction, shift of gravity of spot and shift from ½ track of the spot position are cancelled at the position of the side spot SSP1 so that contributions from wobble tracks are equal to each other. Accordingly, the phase error amplitude detected at the first amplitude detecting circuit 71 becomes maximum as shown in FIG. 9C. Therefore, the position of the side spot SSP1 results in the position suitable for skew detection. It is to be noted that contribution of wobble track of one side becomes great at the position of the side spot SSP2 so that this position does not result in the position for skew detection.

Further, in the case where the radial skew indicates + direction as shown in FIG. 8B, shift of gravity of spot and shift from ½ track of the spot position are cancelled at the position of side spot SSP2 so that contribution from wobble tracks are equal to each other. Accordingly, the phase error amplitude detected at the second amplitude detecting circuit 73 becomes maximum as shown in FIG. 9D. Therefore, the position of the side spot SSP2 results in the position suitable for skew detection. It is to be noted that contribution of wobble track of one side becomes great at the position of side spot SSP1 so that this position does not result in the position suitable for skew detection.

Accordingly, since characteristics are respectively changed in dependency upon positions of side spots SSP1 and SSP2 and direction of radial skew as shown in FIGS. 9A to 9D, difference between both phase error amplitudes may be calculated within the range indicated by dotted lines by difference calculating circuit 74 to generate, from the difference, a skew signal S2 including inclination direction and inclination quantity of the optical disc 102.

It is to be noted that effects/advantages similar to those of the first embodiment can be obtained also in this second embodiment, and there is further provided effect/advantage that the circuit configuration of the skew detecting device can become more simple as compared to the first embodiment.

Further, as described in the first embodiment and the second embodiment, the radial skew signal processing unit 116 for detecting a radial skew signal may be provided at the optical pick-up 104 side, or may be provided at the optical disc apparatus 101 side.

In addition, while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth and defined by appended claims.

INDUSTRIAL APPLICABILITY

As explained above in detail, in accordance with the skew detection method, and the optical pick-up and the optical disc apparatus using such skew detecting device according to the present invention, there is employed such a configuration so as to have ability to detect inclination direction and direction quantity of the optical recording medium by making use of the optical system for recording/reproduction of the optical recording medium. Accordingly, the radial skew of the optical recording medium can be detected at high accuracy, and skew sensor of different structure as in the prior art becomes unnecessary. Thus, the number of components can be reduced, and the optical pick-up and the optical disc apparatus including skew detecting device can be realized at low cost.

The invention claimed is:
1. A skew detection method of detecting inclination of an optical recording medium including wobble grooves for light spot guide, the skew detection method comprising:
separating light beams from a recording/reproduction light source into one main spot and two side spots to irradiate those spots onto a signal recording surface of the optical recording medium to detect, by recording/reproduction light detecting means, reflected light beams respectively corresponding to the main spot and the two side spots which are reflected from the signal recording surface;

detecting, when tracking servo is performed along the wobble grooves of the optical recording medium, phase errors between a wobble signal obtained from reflected light beams of the main spot and wobble signals obtained from reflected light beams of the respective side spots; and generating, from a difference in phase error of the received wobble signals, a skew signal including inclination direction and inclination quantity of the optical recording medium.

2. The skew detection method as set forth in claim 1, wherein the respective side spots are disposed in a state spaced by a predetermined interval in a tangential direction along the wobble grooves of the optical recording medium with respect to the main spot in such a manner that the main spot is put therebetween, and the respective side spots are disposed in a state shifted by ½ track in a radial direction which traverses the wobble grooves with respect to the main spot in such a manner that the main spot is put therebetween.

3. The skew detection method as set forth in claim 1, wherein the detected phase error is an average phase error quantity.

4. The skew detection method as set forth in claim 1, wherein the detected phase error is magnitude of phase change quantity by period shift of adjacent wobble grooves.

5. A skew detection method of detecting inclination of an optical recording medium including wobble grooves for light spot guide, the skew detection method comprising:

separating light beams from a recording/reproduction light source into one main spot and two side spots to irradiate those spots onto a signal recording surface of the optical recording medium to detect, by recording/reproduction light detecting means, reflected light beams respectively corresponding to the main spot and the two side spots which are reflected from the signal recording surface;

respectively detecting, when tracking servo is performed along wobble grooves of the optical recording medium, wobble signals of each side spot from the light detecting means to implement phase locked loop processing to the respective wobble signals to detect phase errors between the wobble signals to thereby detect phase error amplitudes; and generating, from difference between the phase error amplitudes, a skew signal including inclination direction and inclination quantity of the optical recording medium.

6. The skew detection method as set forth in claim 5, wherein the respective side spots are disposed in a state spaced by a predetermined interval in a tangential direction along the wobble grooves of the optical recording medium with respect to the main spot in such a manner that the main spot is put therebetween, and are disposed in a state where the main spot is put therebetween in a radial direction which traverses the wobble grooves from the main spot and at a position where shift quantity in the radial direction which traverses the wobble grooves is not ½ track.

7. An optical pick-up including:
a recording/reproduction light source for emitting light beams for recording or reproduction;

light beam separating means for separating light beams from the light source into one main spot and two side spots for emission therefrom;

converging means for respectively converging the main spot and the side spots to irradiate the main spot and side spots onto an optical recording medium;

light separating means for separating light beams onto the optical recording medium which have been emitted from the light source, and, for separating reflected light beams from the optical recording medium;

recording/reproduction light detecting means for receiving reflected light beams corresponding to the main spot and the respective side spots which have been separated by the light separating means; and a skew detecting device for detecting inclination of the optical recording medium with respect to a optical axis of light beams for recording/reproduction which are irradiated onto the optical recording medium, wherein the skew detecting device comprises:

first and second phase comparison means for respectively comparing and detecting, when tracking servo is performed along wobble grooves of the optical recording medium, phase errors between wobble signal outputted from the light detecting means; and difference calculating means for calculating a difference in phase errors of the received wobble signals, which are outputted from the first and second phase comparison means to generate, from the difference, a skew signal including inclination direction and inclination quantity of the optical recording medium.

8. The optical pick-up as set forth in claim 7, wherein the respective side spots are disposed in a state spaced by a predetermined interval in a tangential direction along the wobble grooves of the optical recording medium with respect to the main spot in such a manner that the main spot is put therebetween, and are disposed in a state where the main spot is put therebetween in a radial direction which traverses the wobble grooves from the main spot and in such a manner that shift quantity in the radial direction which traverses the wobble grooves is equal to ½ track.

9. The optical pick-up as set forth in claim 7, wherein the detected phase error is average phase error quantity.

10. The optical pick-up as set forth in claim 7, wherein the detected phase error is a magnitude of phase fluctuation quantity by period shift of adjacent wobble grooves.

11. The optical pick-up as set forth in claim 7, wherein the optical pickup is caused to be of the configuration in which delay circuits for delaying wobble signal are respectively added to a signal processing system for a wobble signal corresponding to the main spot and a signal processing system for a wobble signal corresponding to side spot so that timings when wobble signals corresponding to the main spot and the respective side spots are compared and detected are caused to be in correspondence with each other by the delay circuits.

12. An optical pick-up including:
a recording/reproduction light source for emitting light beams for recording or reproduction;

light beam separating means for separating light beams from the light source into one main spot and two side spots for emission therefrom;

converging means for respectively converging the main spot and the side spots to irradiate the main spot and side spots thus obtained onto an optical recording medium;

light separating means for separating light beams onto the optical recording medium which have been emitted from the light sources, and, for separating reflected light beams from the optical recording medium;

recording/reproduction light detecting means for receiving reflected light beams corresponding to the main spot and the respective side spots which have been separated by the light separating means; and a skew detecting device for detecting inclination of the optical recording medium with respect to an optical axis of light beams for recording/reproduction which are irradiated onto the optical recording medium, wherein the skew detecting device comprises:

first and second wobble signal detecting means for respectively detecting, when tracking servo is performed along the wobble grooves of the optical recording medium, first and second amplitude detecting means for implementing phase locked loop processing to wobble signals detected at the first and second wobble signal detecting means to detect phase errors between those wobble signals to thereby detect fluctuation amplitudes of the phase errors; and difference calculating means for calculating a difference in phase error of the received wobble signals amplitudes which have been detected at the first and second amplitude detecting means to generate, from the difference, a skew signal including inclination direction and inclination quantity of the optical recording medium.

13. The optical pick-up as set forth in claim 12, wherein the respective side spots are disposed in a state spaced by a predetermined interval in a tangential direction along the wobble grooves of the optical recording medium with respect to the main spot in such a manner that the main spot is put therebetween, and the respective side spots are disposed at a position where shift quantity when they are disposed in a radial direction which traverses the wobble grooves with respect to the main spot are disposed in such a manner that the main spot is put therebetween is not ½ track.

14. An optical disc apparatus including:

drive means for rotationally driving an optical recording medium;

an optical pick-up including a recording/reproduction light source for emitting light beams for recording or reproduction, light beam separating means for separating light beams from the light source into one main spot and two side spots, converging means for converging the main spot and the side spots to irradiate the spots thus converged onto the optical recording medium, light separating means for separating light beams onto the optical recording medium which have been emitted from the light source, and, for separating reflected light beams from the optical recording medium, recording/reproduction and light detecting means for receiving reflected light beams corresponding to the main spot and the respective side spots which have been separated by the light separating means;

control means for controlling rotation of the optical recording medium and movement of the optical pick-up in correspondence with recording and/or reproducing operations; and signal processing means for performing signal processing of recording and/or reproducing operations with respect to the optical recording medium by the optical pick-up, and a skew detecting device for detecting inclination of the optical recording medium with respect to the optical axis of light beams for recording/reproduction which are irradiated onto the optical recording medium, wherein the skew detecting device comprises:

first and second phase comparison means for respectively comparing and detecting, when tracking servo is performed along wobble grooves of the optical recording medium, phase errors between wobble signals outputted from the light detecting means, and difference calculating means for calculating a difference in phase errors of the received wobble signals which are outputted from the first and second phase comparison means to generate, from the difference, a skew signal including inclination direction and inclination quantity of the optical recording medium.

15. The optical disc apparatus as set forth in claim 14, wherein the respective side spots are disposed in a state spaced by a predetermined interval in a tangential direction along wobble grooves of the optical recording medium with respect to the main spot in such a manner that the main spot is put therebetween, and the respective side spots are disposed in a state shifted by ½ track in a radial direction which traverses the wobble grooves with respect to the main spot in such a manner that the main spot is put therebetween.

16. The optical disc apparatus as set forth in claim 14, wherein the detected phase error is average phase error quantity.

17. The optical disc apparatus as set forth in claim 14, wherein the detected phase error is magnitude of phase fluctuation quantity by period shift of adjacent wobbles.

18. The optical disc apparatus as set forth in claim 17, wherein there is employed a configuration such that delay circuits for delaying wobble signals are respectively added to a signal processing system for a wobble signal corresponding to the main spot and a signal processing system for a wobble signal corresponding to the side spot so that timings when wobble signals corresponding to the main spot and the respective side spots are compared and detected are caused to be in correspondence with each other by the delay circuits.

19. An optical disc apparatus including:

drive means for rotationally driving an optical recording medium;

an optical pick-up including a recording/reproduction light source for emitting light beams for recording or reproduction, light beam separating means for separating light beams from the light source into one main spot and two side spots to emit the spots thus obtained, converging means for converging the main spot and the side spots to irradiate the spots thus converged onto the optical recording medium, light separating means for separating light beams onto the optical recording medium which have been emitted from the light sources, and, for separating reflected light beams from the optical recording medium, and recording/reproduction light detecting means for receiving reflected light beams corresponding to the main spot and the respective side spots which have been separated by the light separating means;

control means for controlling rotation of the optical recording medium and movement of the optical pick-up in correspondence with recording and/or reproducing operations; and signal processing means for performing signal processing of recording and/or reproducing operations with respect to the optical recording medium by the optical pick-up, and a skew detecting device for detecting inclination of the optical recording medium with respect to the optical axis of light beams for recording/reproduction which have been irradiated onto the optical recording medium, wherein the skew detecting device comprises first and second amplitude detecting means for implementing phase locked loop processing to wobble signals detected at the first and second wobble signal detecting means when tracking servo is performed along wobble grooves of the optical recording medium to detect phase errors between those wobble signals to thereby detect phase error amplitudes, and difference calculating means for calculating a difference in phase error of the received wobble signal amplitudes which have been detected at the first and second amplitude detecting means to generate, from the difference, a skew signal including inclination direction and inclination quantity of the optical recording medium.

20. The optical disc apparatus as set forth in claim 19, wherein the respective side spots are disposed in a state spaced by a predetermined interval in a tangential direction along the wobble grooves of the optical recording medium with respect to the main spot in such a manner that the main spot is put therebetween, and the respective side spots are disposed at a position where shift quantity when they are disposed in the radial direction which traverses the wobble grooves with respect to the main spot in such a manner that the main spot is put therebetween is not ½ track.

* * * * *